United States Patent
Prociw et al.

(10) Patent No.: US 8,044,319 B2
(45) Date of Patent: Oct. 25, 2011

(54) VARIABLE ARC GAP PLASMA IGNITER

(75) Inventors: Lev Alexander Prociw, Elmira (CA); Dany Clarence Gaudet, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 921 days.

(21) Appl. No.: 11/050,686

(22) Filed: Feb. 7, 2005

(65) Prior Publication Data

US 2006/0175306 A1    Aug. 10, 2006

(51) Int. Cl.
  *B23K 10/00* (2006.01)
  *B23K 9/02* (2006.01)
  *F02C 7/264* (2006.01)
(52) U.S. Cl. ............ 219/121.57; 219/121.54; 60/39.826
(58) Field of Classification Search ............. 219/121.56, 219/121.49, 121.57, 421.56; 313/231.41; 315/111.31, 209, 60, 39, 204, 261, 209 T; 60/204, 261, 39, 39.826
See application file for complete search history.

(56) References Cited

U.S. PATENT DOCUMENTS

| | | | |
|---|---|---|---|
| 2,441,284 A | 5/1948 | Parrish | |
| 2,604,510 A * | 7/1952 | Berkey | 313/126 |
| 3,356,897 A * | 12/1967 | Barr, Jr. et al. | 315/238 |
| 3,800,530 A * | 4/1974 | Nash | 60/761 |
| 4,275,559 A * | 6/1981 | Blair | 60/39.827 |
| 4,690,743 A | 9/1987 | Ethington et al. | |
| 4,791,268 A * | 12/1988 | Sanders et al. | 219/121.57 |
| 4,903,476 A | 2/1990 | Steber et al. | |
| 5,208,441 A * | 5/1993 | Broberg | 219/121.52 |
| 5,210,392 A * | 5/1993 | Labrot et al. | 219/121.52 |
| 5,367,871 A | 11/1994 | Venkataramani et al. | |
| 5,402,637 A | 4/1995 | Adam | |
| 5,493,094 A * | 2/1996 | Simmons | 219/121.52 |
| 5,560,890 A * | 10/1996 | Berman et al. | 422/186.04 |
| 5,587,630 A | 12/1996 | Dooley | |
| 5,619,959 A | 4/1997 | Tozzi | |
| 5,628,180 A * | 5/1997 | DeFreitas | 60/776 |
| 5,640,841 A * | 6/1997 | Crosby | 60/776 |
| 5,654,868 A * | 8/1997 | Buer | 361/256 |
| 5,909,277 A * | 6/1999 | Woskov et al. | 356/316 |
| 6,153,976 A * | 11/2000 | Spanjers | 315/111.21 |
| 6,250,065 B1 * | 6/2001 | Mandai et al. | 60/776 |
| 6,438,940 B1 | 8/2002 | Vacek et al. | |
| 6,442,929 B1 | 9/2002 | Kraft et al. | |
| 6,748,735 B2 * | 6/2004 | Schmotolocha et al. | 60/39.826 |
| 2002/0020691 A1 * | 2/2002 | Jewett et al. | 219/121.59 |
| 2004/0255888 A1 * | 12/2004 | Tuohy | 123/154 |
| 2006/0064987 A1 * | 3/2006 | Veninger | 60/777 |

FOREIGN PATENT DOCUMENTS

| | | |
|---|---|---|
| CA | 2391851 | 3/2001 |
| JP | 02211333 A * | 8/1990 |

OTHER PUBLICATIONS

International Search Report for corresponding PCT International Application No. PCT/CA2006/000150.
The International Preliminary Report on Patentability for Applicant's corresponding PCT International application PCT/2006/000150, mailed by the Canadian Intellectual Property Office as the International Searching Authority on May 15, 2007.

* cited by examiner

*Primary Examiner* — Stephen Ralis
(74) *Attorney, Agent, or Firm* — Norton Rose Or LLP

(57) ABSTRACT

A variable arc gap plasma igniter element includes electrodes moveable relative to each other. The electrodes are preferably set to define a smaller air gap to initiate a plasma arc and later extended to obtain longer plasma arc.

2 Claims, 5 Drawing Sheets

VARIABLE ARC GAP PLASMA IGNITER

FIELD OF THE INVENTION

The present invention relates to an ignition system and more particularly to a continuous plasma ignition system for a gas turbine engine.

BACKGROUND OF THE INVENTION

An ignition system for a gas turbine engine may include a plasma igniter. A plasma arc is generated across an air gap between two electrodes to light fuel in a combustion chamber. The size of the air gap between the two electrodes is a problematic in igniter design. Larger air gaps provide plasma arcs with higher energy but require higher breakdown voltages which can lead to failure in other locations such as at lead connections. Smaller gaps are subject to short circuit if carbon accumulates in the gap.

Therefore, there is a need for an improved plasma igniters.

SUMMARY OF THE INVENTION

One object of the present invention is to provide an improved plasma igniter for gas turbine engines.

In accordance with one aspect of the present invention, there is a variable arc gap plasma igniter element which comprises a first electrode and a second electrode defining a gap therebetween, adapted to generate a plasma arc extending through the gap when an electric voltage is applied across the electrodes. There are means provided for moving the second electrode relative to the first electrode during arcing, from a first position to a second position. The second position increases the gap size relative to the first position.

In accordance with another aspect of the present invention, there is a variable arc gap plasma igniter element provided for gas turbine engines, which comprises a first electrode having an end exposed to a cavity, a second electrode moveable relative to the first electrode and spaced apart therefrom to define a variable-sized gap between the end of the first electrode and an end of the second electrode, and an apparatus adapted to move at least the second electrode to thereby vary the arc size during arcing.

In accordance with a further aspect of the present invention, there is a method provided for operating a variable arc gap plasma igniter element for gas turbine engines, which comprises setting first and second electrodes of a plasma igniter element in a close relationship to define a small arc gap therebetween, applying an electric voltage across the electrodes to initiate a plasma arc across the arc gap, increasing the arc gap size, and injecting a fuel flow adjacent the plasma arc to ignite the fuel.

The present invention advantageously provides extremely long plasma arcs with relatively low breakdown voltages, thereby reducing failure modes. This and other features and advantages of the present invention will be better understood with reference to that which is described hereinafter.

BRIEF DESCRIPTION OF THE DRAWINGS

Reference will now be made to the accompanying drawings in which.

DETAILED DESCRIPTION OF THE PREFERRED EMBODIMENT

Figure 1:
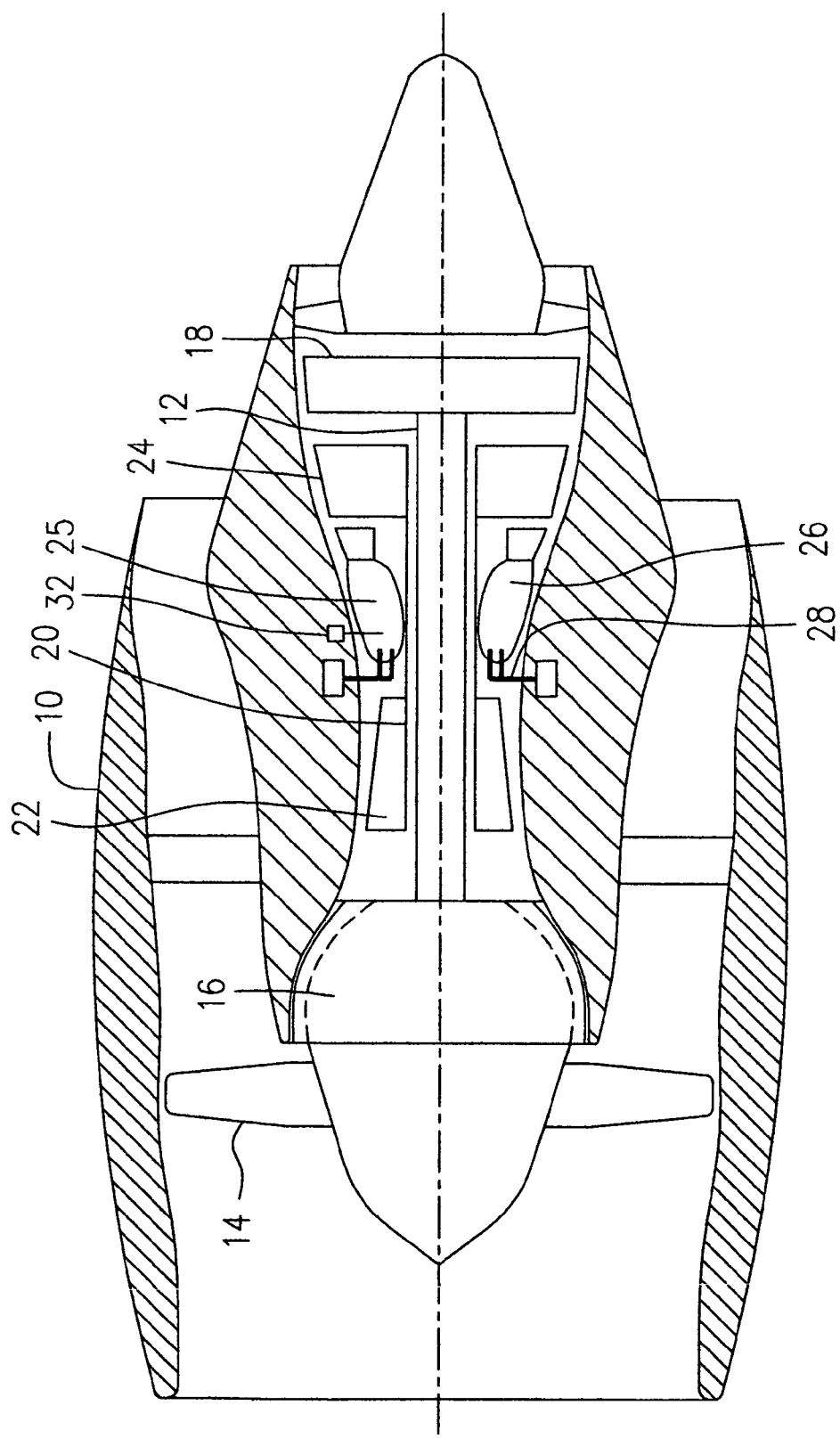
FIG. 1 is a schematic cross-sectional view of a turbofan gas turbine engine, as an example showing an application of the present invention.

A typical application of the present invention for turbofan engines illustrated schematically in FIG. 1, incorporates an embodiment of the present invention presented as an example of the application of the present invention, and includes a housing or nacelle 10, a low pressure spool assembly seen generally at 12 which includes a fan 14, low pressure compressor 16 and low pressure turbine 18, a high pressure spool assembly seen generally at 20 which includes a high pressure compressor 22 and a high pressure turbine 24. There is provided a burner seen generally at 25 which includes an annular combustor 26 and a plurality of fuel injectors 28 for mixing liquid fuel with air and injecting the mixed fuel/air flow into the annular combustor 26 for combustion.

A continuous plasma ignition system generally indicated by numeral 32 is provided in one location of the annular combustor 26 downstream of one of the fuel injectors 28, for initiating a torch ignition process to start the combustion process. The continuous plasma ignition system 32 according to the present invention is adapted to vary the air gap between the electrodes in order to change the energy level of the generated plasma arc therebetween.

It should be noted that similar components of the different embodiments shown in FIGS. 2-5 are indicated by similar numerals for convenience of description of the present invention. Only those components different in one embodiment from the other will be separately described with reference to additional numerals.

Figure 2:
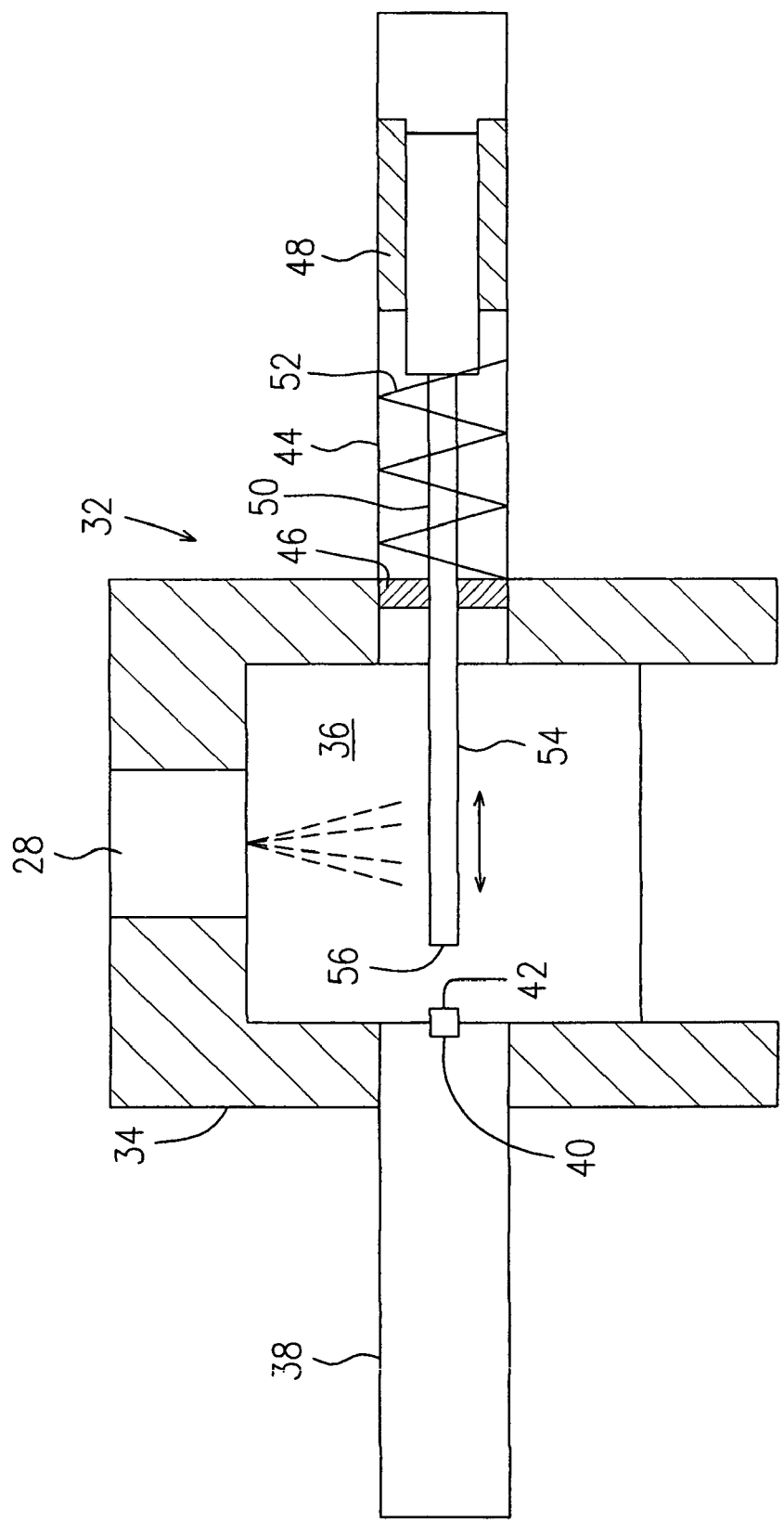
FIG. 2 is a schematic cross-sectional view of a plasma igniter element having a variable arc gap according to one embodiment of the present invention.

Referring to FIG. 2, a continuous plasma ignition system 32 includes an igniter body 34 defining a cavity 36 therein. The cavity 36 is in fluid communication with a chamber of the annular combustor 26 of FIG. 1, or may be a part of the chamber of the annular combustor 26 when the igniter body 34 is a structural part of the combustor 26. One fuel injector 28 is adapted to inject fuel into the cavity 36. The fuel injector 28 is preferably affixed to the igniter body 34 but can also be otherwise attached to other structures of the engine, provided that the fuel injector 28 can inject fuel into the cavity 36 to a predetermined location.

A spark plug 38 which is connected to an electrical high voltage source such as an exciter, is affixed to the igniter body 34 at one side thereof. The spark plug 38 includes an electrode 40 having an end 42 thereof exposed to the cavity 36.

A cylinder 44 is affixed to the igniter body 34 at an opposed side thereof, accommodating a slidable piston 46 therein. A solenoid 48 is attached to the cylinder 44 either inside thereof (as shown in this embodiment) or outside thereof. Piston 46 is connected at one side thereof to the solenoid 48 by a piston rod 50. A spring 52 is provided within the cylinder 44. The spring 52 is attached at one end thereof to the piston 46 and the other end is affixed to the cylinder 44 such that the piston 46, when moving leftwards or rightwards, will cause the spring 52 to be pulled or pressed. An electrode 54 is attached to the piston at the opposed side thereof and extends across the cavity 36 towards electrode 40. The electrode 54 is grounded in an electric circuit (not shown) supplying electric voltage to the spark plug 38. The cylinder 44 is substantially aligned with the plug 38 therefore the electrodes 40 and 54 are aligned with each other.

The electrode 54, piston 46, piston rod 50 and the solenoid 48 are dimensioned and positioned to achieve the following operation of electrode 54. In a first position, the solenoid 48 is activated, and moves the combination of electrode 54, piston 46 and piston rod 50 towards the electrode 40 until an end 56 of the electrode 54 is in a proximity of the end 42 of the electrode 40 (the two ends of the respective electrodes preferably almost touch each other). Therefore, the air gap (not indicated) formed between the two ends 42 and 56 of the respective electrodes 40, 54 has a reduced resistance which requires a relatively low breakdown voltage to be applied to the spark plug 38 in order to initiate a plasma arc to extend through the air gap.

When the plasma arc is initiated, the solenoid 48 is deactivated. Because the spring 52 was pulled to extend when the piston 46 was driven leftwards to the first position by the solenoid 48, the resilient force of the extended spring 52 now pulls the combination of electrode 54, piston 46 and piston rod 50 to move rightwards, back to a neutral position which is referred to as a second position. During the movement of the electrode 54 from the first position to the second position, the plasma arc across the minimum air gap between the ends 42, 56 when the electrode 54 is in the first position, will follow the movement of the electrode 54 and extend because the initial ionization path established across the air gap between the ends 42 and 56 is still the preferred electrical route. In this manner, extremely long plasma arcs that would normally require extremely high breakdown voltages can be established using lower breakdown voltage levels. As the air gap between the end 42 and 56 of the respective electrodes 40, 54 increases, the resistance also increases. Therefore, the longer plasma arc extending through the air gap carries a high level electric energy compared to the initial plasma arc across the minimum air gap between the ends 42, 56 when the electrode 54 is in the first position.

Adequately determining the neutral position of the spring 52 (the second position of the electrode 54) can achieve generation of a plasma arc between the ends 42, 56 of the respective electrodes 40, 54 with a desired electric energy level for initiating a torch ignition process. The resilient properties of the spring 52 should also be adequately determined in order to assure controllable movement of the electrode 54 such that the plasma arc will follow and is maintained during the movement.

When the electrode 54 is in the second position and a longer plasma arc carrying a high electric energy level is established, the fuel injector 28 injects fuel into the cavity 36. The injected fuel is lit by the plasma arc extending between the ends 42, 56 of the respective electrodes 40, 54, thereby initiating a torch ignition process. Once the torch ignition process is initiated, all fuel injectors 28 of FIG. 1 inject fuel continuously into the annular combustor 26 to start and maintain a combustion process. When the ambient air temperature and pressure increase to a certain level during the combustion process, the piston 46 is moved by hot air pressure further rightwards against the resilient force of the spring 52, thereby moving the electrode 54 away from the combustion area in the cavity 36. When the engine stops operation and the hot air pressure within the cavity 36 no longer exists, the spring 52 under its resilient force, moves from the compressed condition to regain the neutral position thereof, thereby moving the combination of the electrode 54, piston 46 and the piston rod 50, back to the second position thereof.

Figure 3:
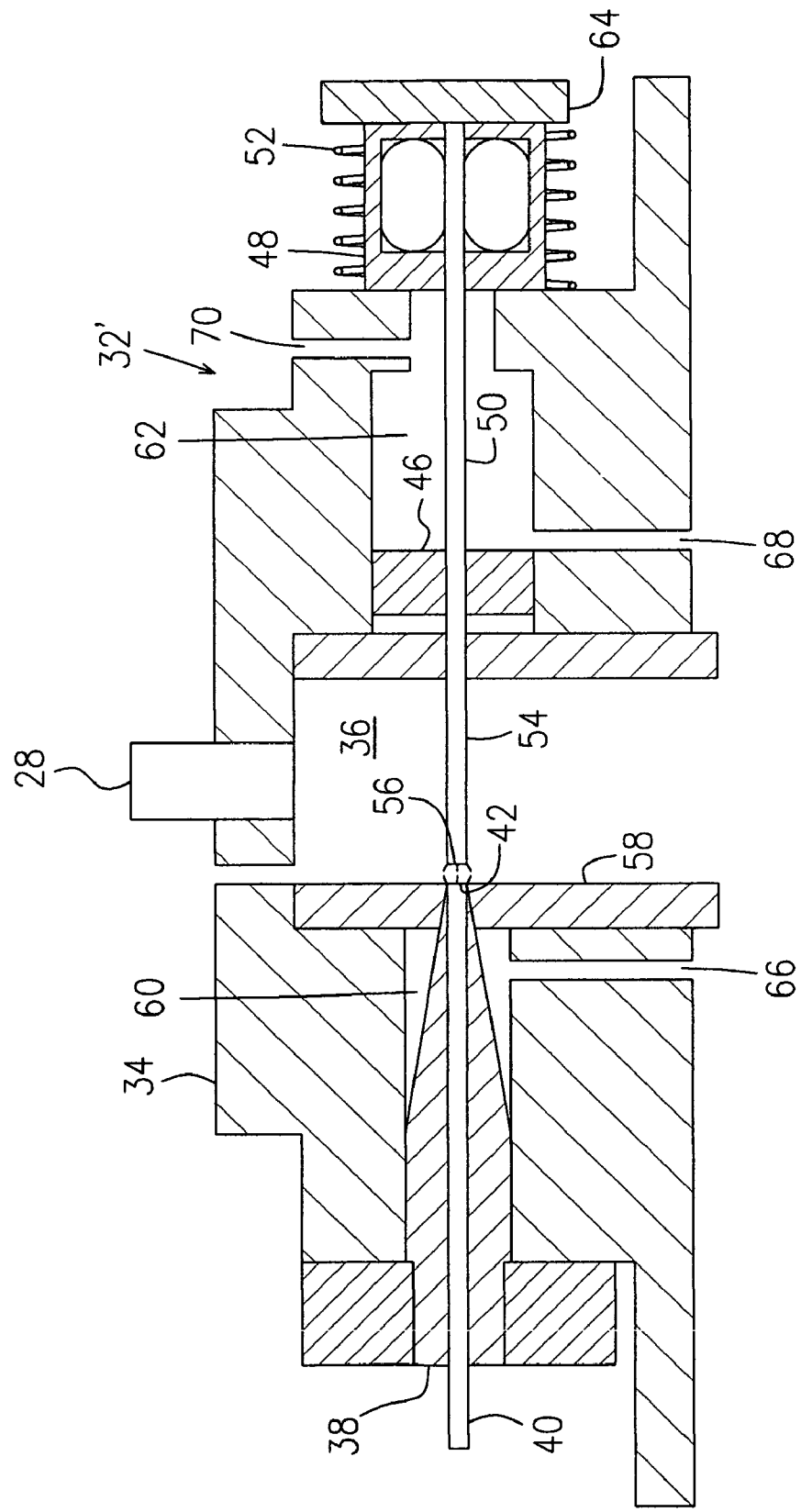
FIG. 3 is a schematic cross-sectional view of a plasma igniter element in a first phase for plasma arc ignition according to another embodiment of the present invention.
Figure 4:
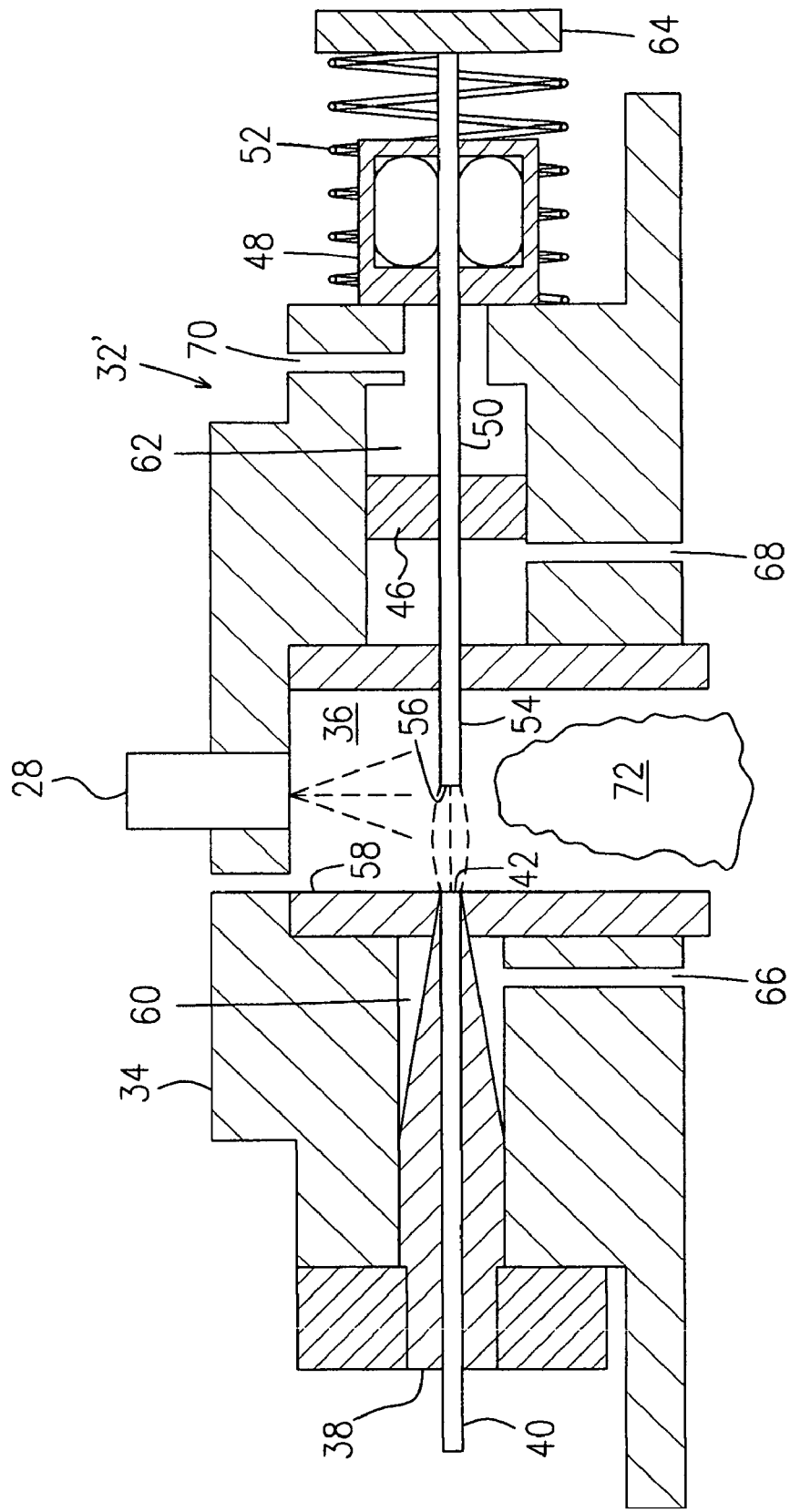
FIG. 4 is a schematic cross-sectional view, showing the plasma igniter element in a second phase to initiate the torch ignition process according to the embodiment of the present invention illustrated in FIG. 3.
Figure 5:
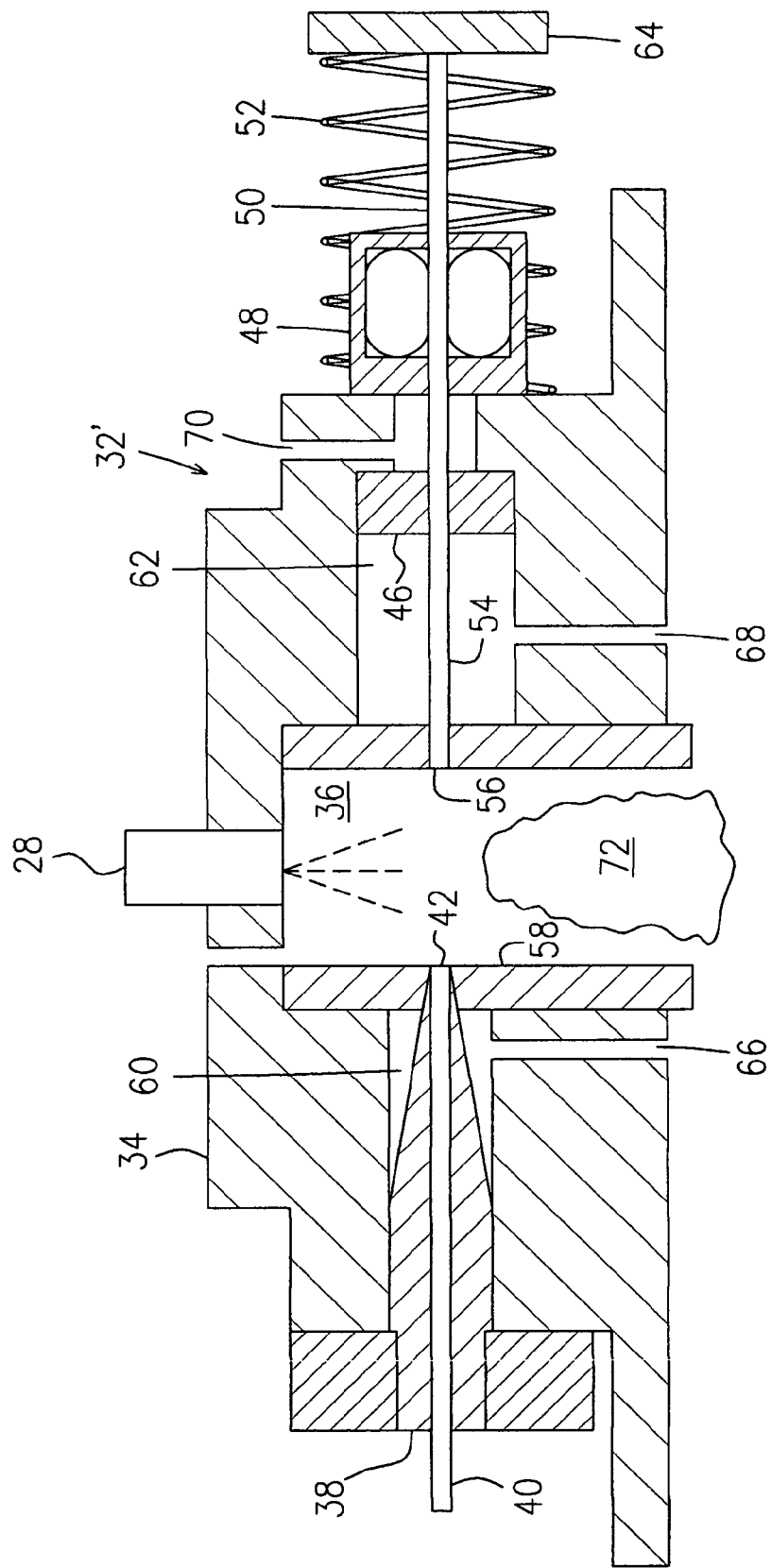
FIG. 5 is a schematic cross-sectional view, showing the plasma igniter element in a third phase to withdraw the moving electrode from the combustion area according to the embodiment of the present invention illustrated in FIG. 3.

Referring to FIGS. 3-5, the continuous plasma ignition system 32' according to another embodiment of the present invention incorporates a cooling system (not indicated) thereinto. Similar to the embodiment of FIG. 2, the system 32' includes the igniter body 34 which defines the cavity 36 in a middle portion thereof. The cavity 36 further includes a ceramic liner 58 attached to the inner surface thereof. The body 34 further defines a cylindrical chamber 60 at one side thereof and a cylindrical chamber 62 at an opposed side thereof. A spark plug 38 affixed within the cylindrical chamber 60 includes the electrode 40, and is electrically connected to a high voltage source. The cylindrical chamber 62 receives the piston member 46 slidably movable therein. The solenoid 48 is affixed to the igniter body 34 at the outside of the cylindrical chamber 62.

The piston rod 50 extends through the solenoid 48 and is attached at an end opposed of the piston 46, to an end member 64. The piston rod 50 can be actuated to move to and remain in the first position as shown in FIG. 3, when the solenoid 48 is activated. In this position, the end member 64 compresses the spring 52 to store a resilient energy therewith. The spring 52 is affixed at one end thereof to the igniter body 34 and connected at the other end thereof to the end member 64. The piston rod 50 is free to move through the solenoid 48 from the first position of FIG. 3 to the second position of FIG. 4 when the solenoid 48 is deactivated and the spring 52 returns to its neutral position, thereby moving the end member 64 outwards.

The piston rod 50 can be further moved through the solenoid 48 from the second position of FIG. 4 to a third position shown in FIG. 5 when the solenoid 48 is deactivated and the piston 46 is pressed by an air pressure differential which will be further discussed below. In this third position, the spring 52 is forced to be extended thereby storing energy in a resilient deformation thereof. When the air pressure differential does not exist, the stored energy of the extended spring 52 will pull the end member 64 and thus the entire combination of electrode 54, piston 46 and piston rod 50, back to the second position of FIG. 4. The electrode 54 connected to the piston 46 thus has three operative positions, which will be further described with reference to an ignition sequence below.

A cooling air circuit (not shown) is provided to the continuous plasma ignition system 32 and is preferably connected to a pressure air source such as the compressor air of the engine. A fluid passage 66 is provided in the igniter body 34, for fluid communication between the cylindrical chamber 60 and the cooling air circuit. Fluid passages 68 and 70 are provided in the igniter body 34 for fluid communication between the cylindrical chamber 62 and the cooling air circuit. The fluid passages 68, 70 are positioned both at the righthand side of the piston 46 in the first position as shown in FIG. 3, and positioned at the opposite sides of the piston 46 when in the second and third positions as shown in FIGS. 4 and 5. The electrode 40 with the spark plug 38, is affixed within the cylindrical chamber 60 of the igniter body 34 and is positioned such that the end 42 of the electrode 40 is exposed to the cavity 36 but does not protrude thereinto, in order to reduce the potential damage of the end 42 of the electrode 40 caused by the high temperature of combustion in the cavity 36.

The electrode 54 with its associated components is designed to meet the following requirements: in the first position as shown in FIG. 3, the end 56 of the electrode 54 is in close proximity with the end 42 of electrode 40; in the second position as shown in FIG. 4, the end 56 of the electrode 54 is located in a predetermined position for generating a plasma arc between the two electrodes 40, 54, having an electric energy level predetermined for initiating a torch ignition process; and in the third position as shown in FIG. 5, the electrode 54 is withdrawn from the cavity 36, and the end 56 of electrode 54 does not protrude into the cavity 36.

The ignition sequence of a gas turbine engine using the continuous plasma ignition system 32' includes three phases. At the initiation of the ignition sequence which is the first phase, the solenoid 48 is activated thereby moving the combination of the electrode 54, piston 46, piston rod 50 and end member 64 against the spring 52 inwardly towards the fixed high voltage electrode 40 until the ends 42, 56 of the respective electrodes 40, 54 almost touch each other. This results in a dependable low power ionization path development across the electrodes 40, 54 when a relatively low breakdown voltage is applied over the electrodes, regardless of the insulation around the cavity 36 or the electrodes 40, 54. An initial plasma arc is thus generated, as shown in FIG. 3.

When the initial plasma arc is generated the ignition sequence enters the second phase as shown in FIG. 4. In this second phase, the solenoid 48 is deactivated and the retracting forces of the compressed spring 48, pulls the ground connected electrode 54 away from the high voltage electrode 40 with the initial plasma arc following the movement of the electrode 54. The resistance of the air gap between the ends 42, 56 of the respective electrodes 40, 54 increases as does the electric energy input into the extending plasma arc. The length of the air gap may be much longer than could be crossed by a plasma arc from a static condition, because the ionization path developed in the initial small air gap helps establish the initial arc and promotes its further growth. Once the spring 52 reaches its neutral position, the electrode 54 reaches a predetermined position at which the working air gap is set. Fuel is then injected from the fuel injector 28 into the plasma arc in order to initiate the torch ignition process. Once the torch ignition is initiated, a stable combustion process is started and maintained in a combustion area 72 within the cavity 36, provided that all fuel injectors 28 of the engine continuously inject fuel into the annular combustor 26 of FIG. 1.

The engine ignition sequence is part of an engine starting process. Prior to and during the first and second phases of the engine ignition sequence as shown in FIGS. 3 and 4, the engine high pressure compressor 22 of FIG. 1 is rotated by a starter (not shown). Therefore pressure air is generated and introduced through the fluid passage 66, 68 into the respective cylindrical chambers 60, 62 to cool the respective electrodes 40 and 54. In the first phase as shown in FIG. 3, the pressure air enters the cylindrical chamber 62 from the fluid passage 68 and exits from the fluid passage 70, having little pressure effect on the piston 46. In the second phase of the ignition sequence as shown in FIG. 4, piston 64 moves to the middle of the cylindrical chamber 62, thereby blocking the cooling air path from the passage 68 to 70 through the cylindrical chamber 62. Thus, the pressure air entering the left side of the cylindrical chamber 62 through the fluid passage 68 builds up a pressure differential over the opposed sides of the piston 46. Nevertheless, at this stage, the high pressure compressor 22 of FIG. 1 is driven by an engine starter at a limited speed and cannot generate high pressure air. Therefore, the air pressure differential over the opposed sides of piston 46 is not enough to significantly move the piston 46 outwardly against the resilient force of the spring 52.

Once the torch ignition is initiated and the combustion process is started, the electrical voltage applied over the electrodes 40, 54 is withdrawn and no plasma arc further exists between the ends 42, 56 of the respective electrodes 40, 54. In the third phase of the ignition sequence as shown in FIG. 5, the combustion in the annular combustor 26 of the engine of FIG. 1 is stable and the engine reaches a certain power level, which results in the capability of the high pressure compressor 22 of FIG. 1 to generate compressor air at a predetermined pressure level. At this stage, the air pressure differential built over the opposed sides of the piston 46 is enough to overcome the resilient forces of the spring 52, thereby moving the piston 46 to the third position as shown in FIG. 5. In this position the piston 46 abuts a stop shoulder (not indicated) of the cylindrical chamber 62 and the end 56 of the electrode 54 does not protrude into the cavity 36, thereby being protected from the high temperature of the combustion area 72 within the cavity 36. In this way, both electrodes 40, 54 are withdrawn from direct exposure to fuel and combustion gases, thereby increasing the life of the electrodes. The electrode 54 remains withdrawn until the air pressure differential over the opposed sides of the piston 46 falls and the extended spring 52 returns the combination of the electrode 54, piston 46, piston rod 50, back to the neutral position which is the second position shown in FIG. 4.

It is preferable to include in the electric circuit of the continuous plasma ignition system 32', means (not shown) for detecting the absence of electrical current in the ground circuit resulting from plasma arc process failure due to electrode deterioration. When such a situation is detected a warning signal is generated and sent to the engine display panel.

The present invention advantageously provides the apparatus for a standard method for a continuous plasma ignition system for gas turbine engines, which requires lower electrical insulation for dependable plasma arc initiation, and which provides a, higher power plasma arc than the conventionally available plasma arc from conventional static electrodes. In accordance with the present invention, a variable arc gap plasma ignition system can be operated under severe operative conditions. For example, a plasma arc can be initiated with adequate breakdown voltages even when the air gap is flooded with liquid fuel or water because the flooded gap can be adjusted to a minimum to reduce the resistance between the electrodes. The present invention further advantageously provides longer electrode life for plasma ignition systems.

By moving the electrodes close together to initiate the process, the minimum air gap becomes the lowest resistance path and an initial arc will arise there, even under conditions which would cause plasma arc initiation failure of conventional plasma igniters, as discussed in the background of the invention. Once the initial plasma arc is started, the electrodes move away from each other and the plasma arc will follow because the initial ionization path is still the preferred electrical route.

It should be noted that the above-described embodiments are merely part of an ignition system of gas turbine engines, and especially addresses the problem associated with the failure to ignite a plasma arc between electrodes in those systems. Therefore, the present invention is applicable to any continuous plasma ignition system, and is not limited to the above-described embodiments. The present invention is also applicable to any type of gas turbine engine, not being limited to the turbofan engine taken as an example to illustrate the application of the present invention. The particular motive and biasing systems disclosed for moving the electrode(s) are but of a multitude of possibilities which will become apparent to the skilled reader, and thus is intended to be merely exemplary, and the motive and biasing means need not be separated, either. Likewise the cooling system disclosed is merely one of many possibilities now within the ordinary skill in the art in light of this description. Although described as 3 distinct phases, it will be understood that the phases may overlap or occur more or less at the same time. For example, the second and third phases (FIGS. 4 and 5 may be integrated into a single step, such that the second phase is rather an element of phase three. Although the embodiments described include a fixed electrode and a moveable electrode, both may be moved if desired.

Still other modifications to the above-described embodiments of the present invention will be apparent to those skilled in the art without departing form the principles disclosed. For example, the solenoid and spring in the above-described embodiments can be replaced by linear actuators of any type, such as a linear electric motor, linear hydraulic motor, or a motor with gears and racks, etc. Therefore, the foregoing description is intended to be exemplary rather than limiting. The scope of the present invention is therefore intended to be limited solely by the scope of the appended claims.

We claim:

1. A variable arc gap plasma igniter for gas turbine engines, comprising:
   a cavity having opposed ends thereof, one for receiving a combustion fuel flow injected therein and the other being open and in fluid communication with a combustor, thereby forming a passage for the combustion fuel flow to pass through the cavity;
   first electrode and a second electrode located at respective opposed sides of the cavity and defining a gap therebetween within the cavity, adapted to generate a plasma arc extending through the gap when an electric voltage is applied across the electrodes to ignite the combustion fuel flow and cause an initiating flame to move through the passage away from the first and second electrodes;
   an igniter body with which the second electrode is moveably associated, the second electrode being extendable into the cavity while the igniter body remains outside the cavity;
   means for moving the second electrode relative to the first electrode and relative to the igniter body in a direction substantially perpendicular to the passage during arcing from a first position to a second position, the second position increasing the gap size relative to the first position; and wherein the cavity includes a combustion fuel inlet and a combustion product outlet, the inlet and outlet defined independently of the electrodes.

2. The variable arc gap plasma igniter as claimed in claim 1, wherein the inlet and outlet are defined in opposed ends of the cavity, said opposed ends being different from the opposed sides of the cavity for locating the electrodes.

* * * * *